United States Patent
Di et al.

(10) Patent No.: US 12,499,609 B2
(45) Date of Patent: Dec. 16, 2025

(54) VIDEO GENERATING DEVICE AND METHOD

(71) Applicant: INSTITUTE FOR INFORMATION INDUSTRY, Taipei (TW)

(72) Inventors: Min Di, Taipei (TW); Kuan-Yu Chen, Taipei (TW); Jing Tong Fu, Taipei (TW); Ming-Fang Weng, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 133 days.

(21) Appl. No.: 18/403,742

(22) Filed: Jan. 4, 2024

(65) Prior Publication Data

US 2025/0166289 A1 May 22, 2025

(30) Foreign Application Priority Data

Nov. 17, 2023 (TW) ................................ 112144634

(51) Int. Cl.
*G06T 15/20* (2011.01)
*G06T 7/11* (2017.01)
(Continued)

(52) U.S. Cl.
CPC ............... *G06T 15/20* (2013.01); *G06T 7/11* (2017.01); *G06T 7/174* (2017.01); *G06T 7/70* (2017.01);
(Continued)

(58) Field of Classification Search
CPC . G06T 15/20; G06T 7/11; G06T 17/00; G06T 7/174; G06T 17/20; G06T 7/70; G06T 2207/10016; G06T 2207/30242
(Continued)

(56) References Cited

U.S. PATENT DOCUMENTS

| 11,736,679 B2* | 8/2023 | Matsuda | H04N 13/322 |
| | | | 348/51 |
| 2019/0094981 A1* | 3/2019 | Bradski | G06V 40/168 |

(Continued)

FOREIGN PATENT DOCUMENTS

| CN | 102957748 A | 3/2013 |
| CN | 108933913 A | 12/2018 |

OTHER PUBLICATIONS

Wang T, Zhang B, Zhang T, Gu S, Bao J, Baltrusaitis T, Shen J, Chen D, Wen F, Chen Q, Guo B. Rodin: A generative model for sculpting 3d digital avatars using diffusion. InProceedings of the IEEE/CVF conference on computer vision and pattern recognition 2023 (pp. 4563-4573).*

(Continued)

*Primary Examiner* — Phu K Nguyen
(74) *Attorney, Agent, or Firm* — CKC & Partners Co., LLC

(57) ABSTRACT

A video generating device and method are provided. The device analyzes a plurality of real-time images corresponding to a plurality of users to segment a target image from each of the real-time images. The device generates a three-dimensional portrait model corresponding to each of the users based on the target image of each of the real-time images. The device determines a first three-dimensional scenario template from the three-dimensional scenario templates based on a user quantity of the users and the position quantity corresponding to each of the three-dimensional scenario templates. The device composites the three-dimensional portrait models to the spatial label position of the first three-dimensional scenario template to generate a video corresponding to the users.

18 Claims, 6 Drawing Sheets

(51) Int. Cl.
    *G06T 7/174*     (2017.01)
    *G06T 7/70*     (2017.01)
    *G06T 17/20*     (2006.01)

(52) U.S. Cl.
    CPC .... *G06T 17/20* (2013.01); *G06T 2207/10016* (2013.01); *G06T 2207/30242* (2013.01)

(58) Field of Classification Search
    USPC .......................................................... 345/418
    See application file for complete search history.

(56) References Cited

U.S. PATENT DOCUMENTS

| | | | |
|---|---|---|---|
| 2023/0237192 A1* | 7/2023 | Kahan | G06V 10/60 726/1 |
| 2023/0262317 A1* | 8/2023 | O'Leary | H04L 65/1059 |
| 2024/0119682 A1* | 4/2024 | Rudman | G06T 19/006 |
| 2025/0054254 A1* | 2/2025 | Kahan | G06V 20/20 |

OTHER PUBLICATIONS

The office action of the corresponding Taiwan application No. TW112144634 issued on Oct. 30, 2024.

* cited by examiner

VIDEO GENERATING DEVICE AND METHOD

CROSS-REFERENCE TO RELATED APPLICATION

This application claims priority to Taiwan Application Serial Number 112144634, filed Nov. 17, 2023, which is herein incorporated by reference in its entirety.

BACKGROUND

Field of Invention

The present invention relates to a video generating device and method. More particularly, the present invention relates to a video generating device and method for generating video of a plurality of users.

Description of Related Art

In the prior art, when multiple participating users conduct a video conference, the video used by the participating users can usually only be presented in a fixed manner. For example, the video of multiple users are presented in a fixed two-dimensional format and a fixed dimensional arrangement or a traditional background is displayed on the video. Under such circumstances, the video presented cannot provide users participating in the meeting with a good meeting experience.

Accordingly, there is an urgent need for a video generating technology that can generate video of a plurality of users.

SUMMARY

In view of the above, the present disclosure provides a video generating device and method that solve the above problems.

An objective of the present disclosure is to provide a video generating device. The video generating device comprises a transceiver interface, a storage, and a processor, and the processor is electrically connected to the transceiver interface and the storage. The storage is configured to store a plurality of three-dimensional scenario templates, wherein each of the three-dimensional scenario templates corresponds to a position quantity and a spatial label position. The processor analyzes a plurality of real-time images corresponding to a plurality of users to segment a target image from each of the real-time images. The processor generates a three-dimensional portrait model corresponding to each of the users based on the target image of each of the real-time images. The processor determines a first three-dimensional scenario template from the three-dimensional scenario templates based on a user quantity of the users and the position quantity corresponding to each of the three-dimensional scenario templates. The processor composites the three-dimensional portrait models to the spatial label position of the first three-dimensional scenario template to generate a video corresponding to the users.

Another objective of the present disclosure is to provide a video generating method, which is adapted for use in an electronic apparatus. The electronic apparatus stores a plurality of three-dimensional scenario templates, each of the three-dimensional scenario templates corresponds to a position quantity and a spatial label position. The video generating method comprises the following steps: analyzing a plurality of real-time images corresponding to a plurality of users to segment a target image from each of the real-time images; generating a three-dimensional portrait model corresponding to each of the users based on the target image of each of the real-time images; determining a first three-dimensional scenario template from the three-dimensional scenario templates based on a user quantity of the users and the position quantity corresponding to each of the three-dimensional scenario templates; and compositing the three-dimensional portrait models to the spatial label position of the first three-dimensional scenario template to generate a video corresponding to the users.

According to the above descriptions, the video generating technology (at least including the device and the method) provided by the present disclosure generates three-dimensional portrait models corresponding to each of the users by segmenting target images from each of the real-time images. Next, the video generating technology provided by the present disclosure determines a suitable three-dimensional scenario template from the three-dimensional scenario templates based on a user quantity and a position quantity corresponding to each of the three-dimensional scenario templates. Finally, the video generating technology provided by the present disclosure composites the three-dimensional portrait models to the spatial label position of the three-dimensional scenario template to generate video corresponding to the users. The video generating technology provided by the present disclosure can correspondingly select a suitable three-dimensional scenario template, and adaptively composite the three-dimensional portrait model to the three-dimensional scenario template, thereby solving the shortcomings of the conventional technology that the videos are too dull and the images are unnatural, and provides users participating in the meeting with an immersive experience that is closer to the real scene.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a video generating device and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
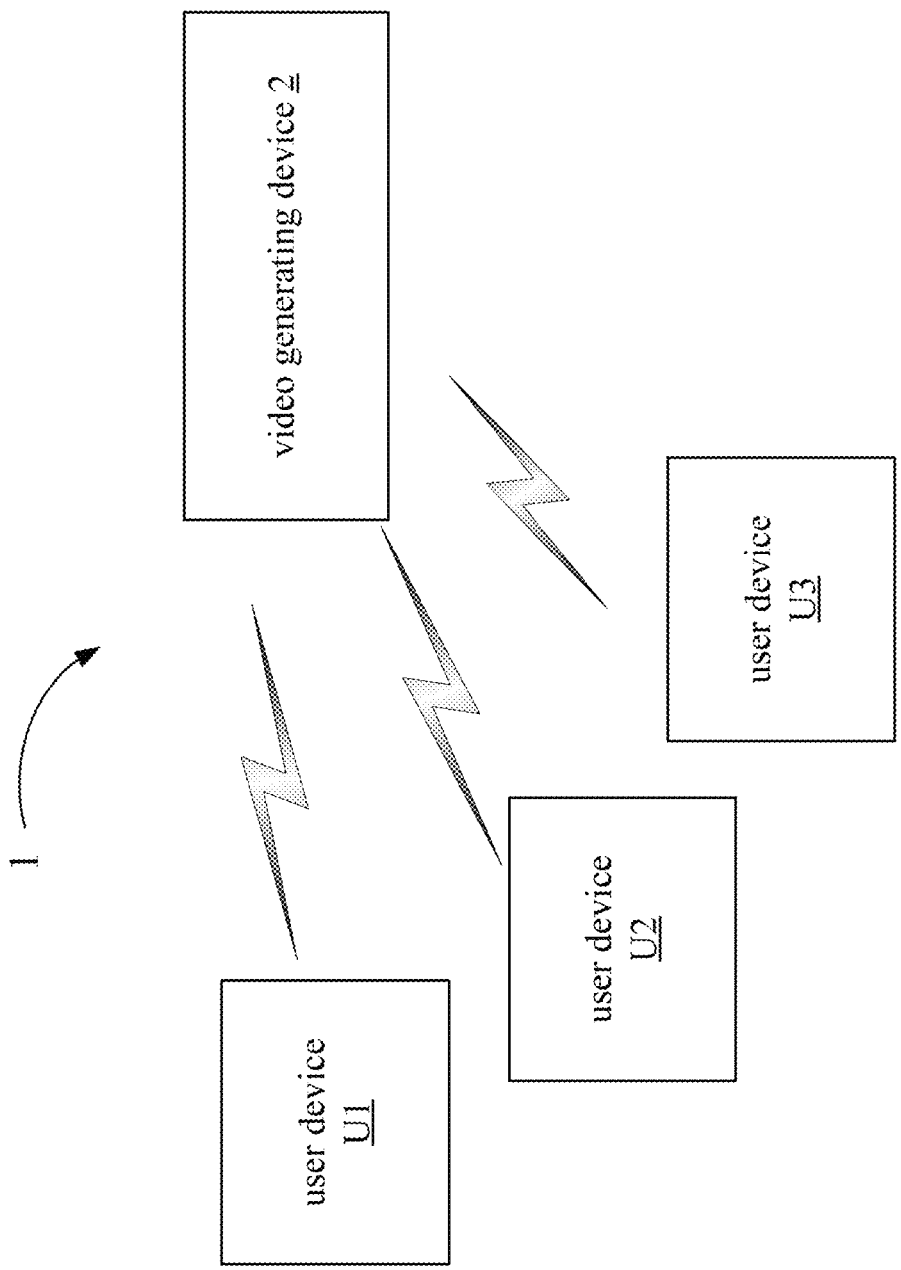
FIG. 1 is a schematic view depicting a video conferencing system of the first embodiment.

First, the applicable scenario of the present disclosure will be described, and its schematic diagram is depicted in FIG. 1. As shown in FIG. 1, in the present disclosure, the video conference system 1 comprises a video generating device 2 and user devices U1, U2, and U3. In the present scenario, the user devices U1, U2, and U3 can be connected to the video generating device 2 through a wired or wireless network. It shall be appreciated that the user devices U1, U2, and U3 may continuously generate real-time images (for example, at a frequency of 30 frames per second), and transmit the real-time in images to the video generating device 2. The video generating device 2 may generate video and then return the video to the user devices U1, U2, and U3.

It shall be appreciated that FIG. 1 is only for illustration. The present disclosure does not limit the number of user devices connected to the video generating device 2. Those of ordinary skill in the art to which this application belongs shall appreciate the implementation of other user device numbers based on the descriptions of the present disclosure. Therefore, the details will not be repeated herein.

Figure 2:
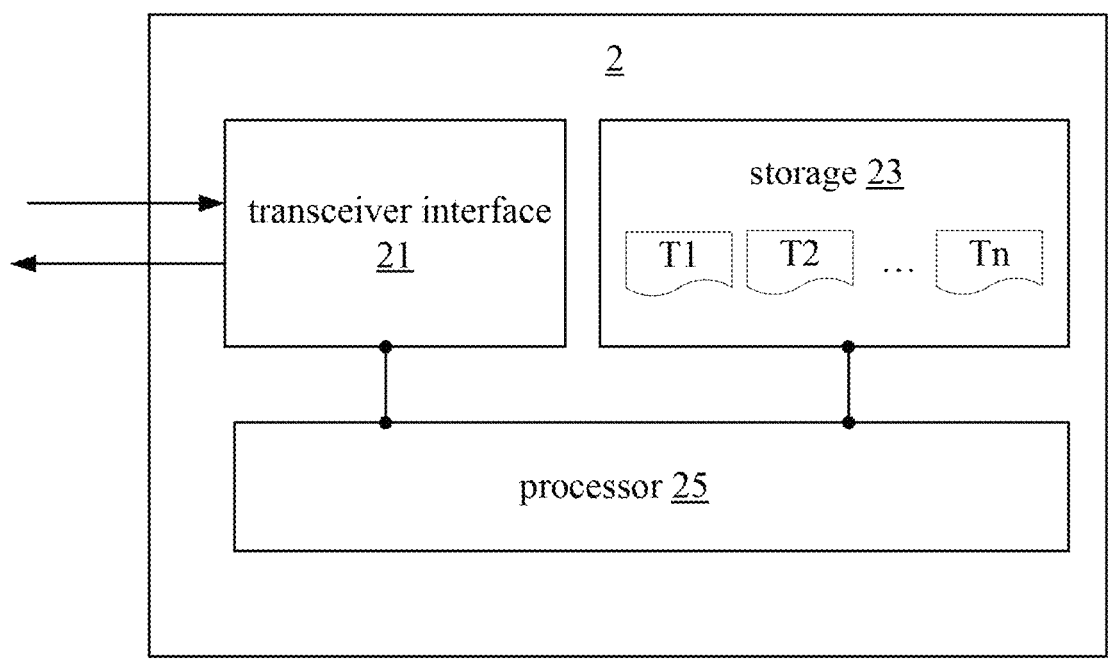
FIG. 2 is a architecture schematic view depicting a video generating device of some embodiments.

A first embodiment of the present disclosure is a video generating device 2, the schematic structural diagram of which is depicted in FIG. 2. The video generating device 2 comprises a transceiver interface 21, a storage 23, and a processor 25, the processor 25 is electrically connected to the transceiver interface 21 and the storage 23. In the present embodiment, the storage 23 is configured to store a plurality of three-dimensional scenario templates T1, T2, . . . , Tn.

In the present embodiment, each of the three-dimensional scenario templates T1, T2, . . . , Tn corresponds to a position quantity and a spatial label position. It shall be appreciated that each of the three-dimensional scenario templates T1, T2, . . . , and Tn may correspond to the three-dimensional mesh model of different scenarios or different environmental spaces, and each of the three-dimensional scenario templates T1, T2, . . . , and Tn may correspond to the appropriate number of participating users and the default locations in the space.

Figure 4:
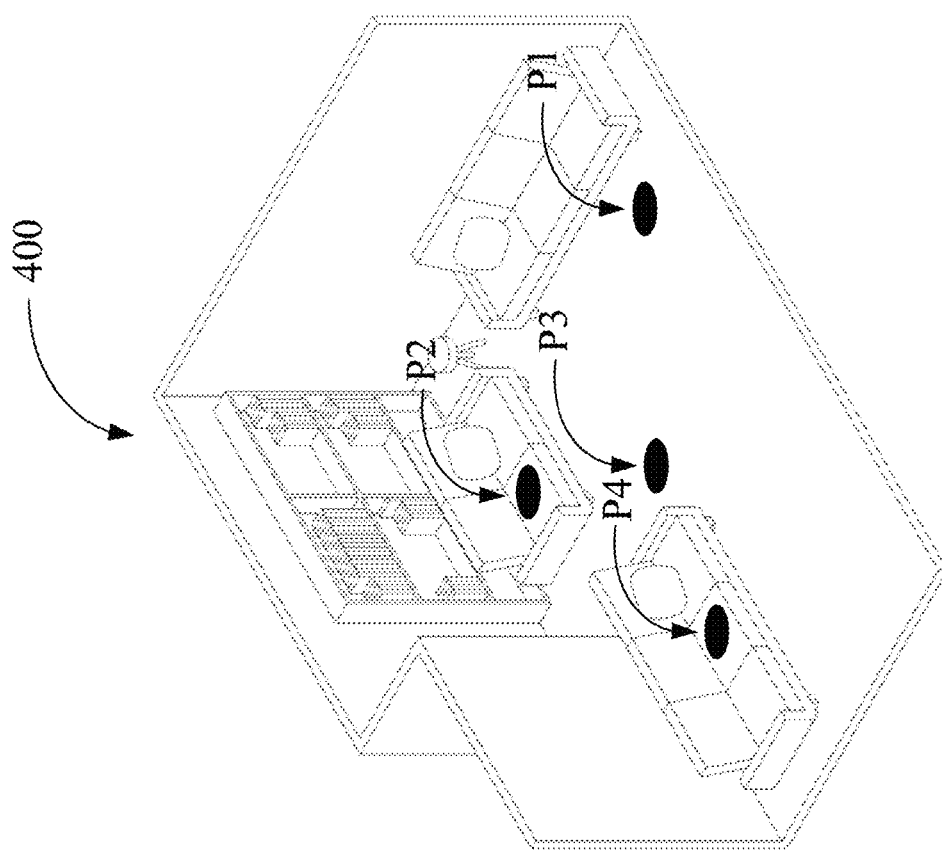
FIG. 4 is a schematic view depicting a three-dimensional scenario template of some embodiments.

For ease of understanding, please refer to the three-dimensional scenario template schematic diagram 400 illustrated in FIG. 4. As shown in FIG. 4, it illustrates a three-dimensional scenario template of the living room space. In the present example, the three-dimensional scenario template comprises spatial label positions P1, P2, P3, and P4 (i.e., the positions where the participating user images will be composited), and the position quantity is 4 (i.e., the maximum number of participating users is 4).

It shall be appreciated that the transceiver interface 21 is an interface capable of receiving and transmitting data or other interfaces capable of receiving and transmitting data and known to those of ordinary skill in the art. The transceiver interface 21 can receive data from sources such as external apparatuses, external web pages, external applications, and so on. The storage 23 may be a memory, a Universal Serial Bus (USB) disk, a hard disk, a Compact Disk (CD), a mobile disk, or any other storage medium or circuit known to those of ordinary skill in the art and having the same functionality. The processor 25 may be any of various processors, Central Processing Units (CPUs), microprocessors, digital signal processors or other computing apparatuses known to those of ordinary skill in the art.

First, in the present embodiment, the processor 25 analyzes a plurality of real-time images corresponding to a plurality of users (for example: users operating the user devices U1, U2, U3) to segment a target image from each of the real-time images.

Figure 3A:
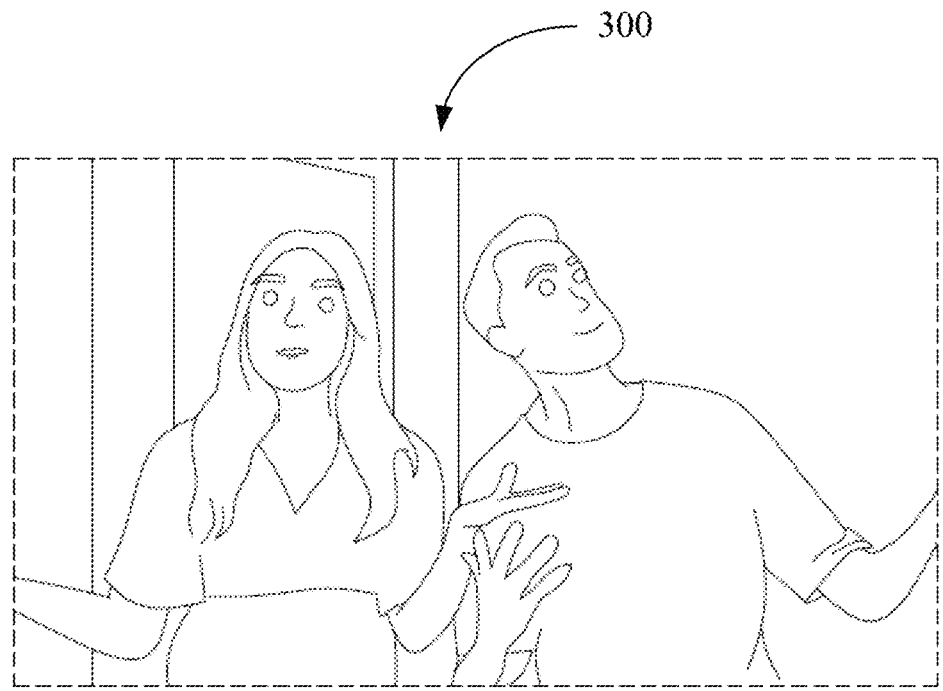
FIG. 3A is a schematic view depicting a real-time image of some embodiments.
Figure 3B:
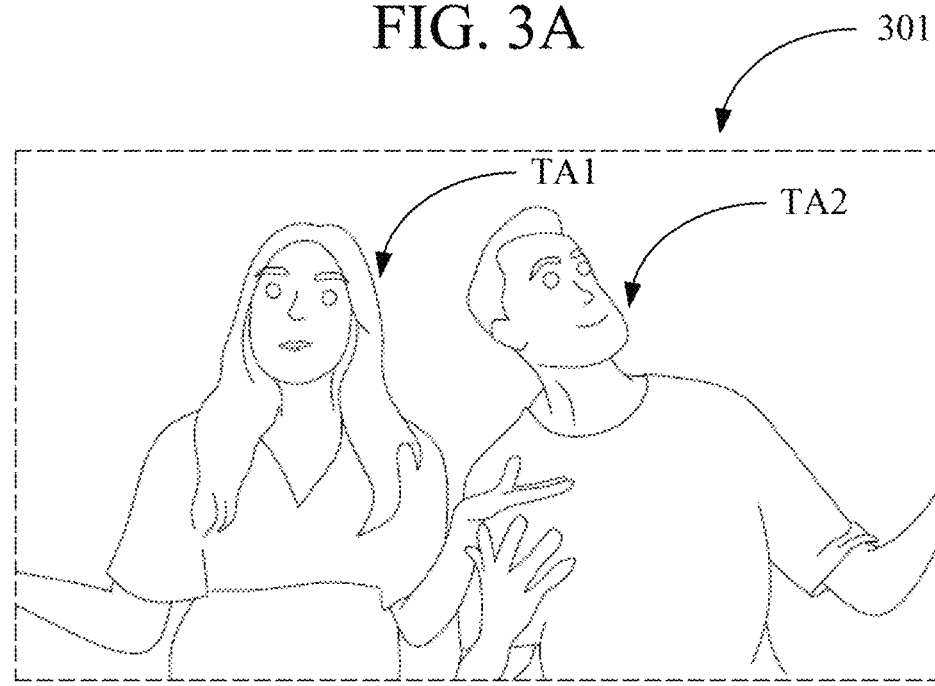
FIG. 3B is a schematic view depicting a image after removing the background image of some embodiments.

For ease of understanding, please refer to schematic diagram of the real-time image 300 illustrated in FIG. 3A and the background-removed image 301 schematic diagram illustrated in FIG. 3B. In FIG. 3A and FIG. 3B, the processor 25 receives the real-time image 300 from the user device, and generates the background-removed image 301 and the segmented target images TA1 and TA2 by performing an image matting operation.

It shall be appreciated that the processor 25 can perform a background removal operation on the real-time image by executing a high-resolution background removal algorithm (for example, the RobustVideoMatting algorithm or the Deep Image Matting algorithm, etc.) to generate a high-resolution target image.

Next, the processor 25 generates a three-dimensional portrait model corresponding to each of the users based on the target image of each of the real-time images.

In some embodiments, a three-dimensional portrait model corresponding to a user may be constructed through a trained diffusion model and a plurality of real-time images corresponding to the user (For example: virtual substitute avatar, PV3D, styleNerf, StyleSDF, EG3D, etc.).

In some embodiments, based on RODIN Diffusion technology, the processor 25 may reduce the amount of real-time image data and modeling time required to build the model.

Next, the processor 25 determines a suitable three-dimensional scenario template from the three-dimensional scenario templates T1, T2, . . . , Tn based on a user quantity and the position quantity corresponding to each of the three-dimensional scenario templates (e.g., referred to as the first three-dimensional scenario template in some embodiments). For ease of explanation, the following paragraphs will use the first three-dimensional scenario template as the selected three-dimensional scenario template.

For example, if the number of users participating in this meeting is 2-4, the processor 25 determines a three-dimensional scenario template that matches the position quantity from the three-dimensional scenario templates T1, T2, . . . , Tn (e.g., the three-dimensional scenario template shown in FIG. 4), and adds the three-dimensional scenario template serves as the background space of the present video for subsequent compositing.

In some embodiments, the processor 25 may also select a suitable three-dimensional scenario template from the three-dimensional scenario templates T1, T2, . . . , Tn based on other conditions (such as the theme of the meeting, the age of the participating users, the style of the participating users, the distance relationship between each position, suitable for the spatial environment, etc.), which will not be further described.

It shall be appreciated that the three-dimensional scenario template can be generated through a pre-learned training model. Specifically, the processor 25 may input a plurality of two-dimensional images (e.g., images corresponding to the space) and description text corresponding to each of the two-dimensional images (e.g., description of the corresponding space) into a depth model to generate the three-dimensional scenario templates, and the depth model is trained by a plurality of scene depth maps.

For example, the processor 25 may collect a plurality of two-dimensional images corresponding to a plurality of different spaces and containing depth information. Then, the processor 25 may obtain the scene depth map by inputting the two-dimensional images into the depth assessment model. Next, the processor 25 combines the scene depth map with a pre-trained text-to-image model (e.g., AI model) to generate a three-dimensional mesh model of the target space (e.g., study room environment, conference room environment, or classroom environment, etc.). Finally, the processor 25 labels the position quantity and the spatial label position of the three-dimensional mesh model to generate a corresponding three-dimensional scenario template.

Finally, the processor 25 composites the three-dimensional portrait models to the spatial label position of the first three-dimensional scenario template to generate a video corresponding to the users.

For ease of understanding, please refer to FIG. 4. In the present example, the processor 25 can composite the user images (i.e., three-dimensional portrait models) corresponding to the user quantity of 4 (or less than this number) to the spatial label positions P1, P2, P3, and P4, and generate video corresponding to the users.

In some embodiments, in order to make the quality of the generated video better, the three-dimensional scenario template may further comprise environment parameters (e.g., lighting parameters, hue parameters, shadows, spatial line positions, etc. of each area), and the processor 25 further renders the three-dimensional portrait models based on the environment parameters to generate the video corresponding to the users.

In some embodiments, in order to better integrate the target image into the three-dimensional scenario template, the compositing operation can be performed through a pre-trained diffusion model. Specifically, the foreground image (e.g., a target image segmented from a real-time image) and the background image (e.g., a three-dimensional scenario template) may be input to the diffusion model respectively, and the three-dimensional portrait models may be composited to the spatial label position of the first three-dimensional scenario template through additional input parameters (e.g., the lighting indication vector, the pose attribute vector).

For example, the processor 25 may use a controllable image composition (e.g., ControlCom-Image-Composition or Collage Diffusion) model to perform the compositing operation.

In some embodiments, the processor 25 generates the video corresponding to the users including the following operations. The processor 25 inputs the environment parameter of the first three-dimensional scenario template (e.g., the environment parameter comprises a lighting indication vector and a pose attribute vector), the three-dimensional portrait models, and the spatial label position of the first three-dimensional scenario template into a pre-trained diffusion model to generate the video corresponding to the users.

In some embodiments, in order to make the video more consistent with the three-dimensional scenario template, each spatial label position in the three-dimensional scenario template can be further corresponding to the portrait pose setting (i.e., the corresponding default pose of the user). Specifically, the spatial label position of the first three-dimensional scenario template further corresponds to a portrait pose setting, and the processor 25 composites the three-dimensional portrait model corresponding to the portrait pose setting to the spatial label position of the first three-dimensional scenario template to generate the video corresponding to the user.

For ease of understanding, please refer to FIG. 4. In the present example, the spatial label positions P2 and P4 correspond to the portrait pose setting of the user in a sitting pose (i.e., when the three-dimensional portrait model is composited to this position, the three-dimensional portrait model is presented in a sitting pose). In addition, the spatial label positions P1 and P3 correspond to the portrait pose setting of the user in a standing pose (i.e., when the three-dimensional portrait model is composited to this position, the three-dimensional portrait model is presented in a standing pose).

It shall be appreciated that in the present disclosure, the portrait pose setting may further comprise other motions, such as dynamic motion, specific postures, interactive relationships between positions, etc., and the present disclosure is not limited thereto.

In some embodiments, in order to improve the quality of videos, each of the three-dimensional scenario templates T1, T2, . . . , Tn can further comprise a plurality of spatial perspectives, so that the video can be played through different perspectives (e.g., played in turn from different perspectives).

Specifically, the processor 25 generates a perspective video corresponding to each of the spatial perspectives based on the spatial perspectives. Next, the processor 25 transmits the perspective videos to a playing device based on a perspective switching mechanism to make the playing device performs a playing operation.

For example, the perspective switching mechanism may be a speaking position priority (i.e., switching to the perspective image corresponding to the speaker), a random playing, or a round-robin playing.

Figure 5:
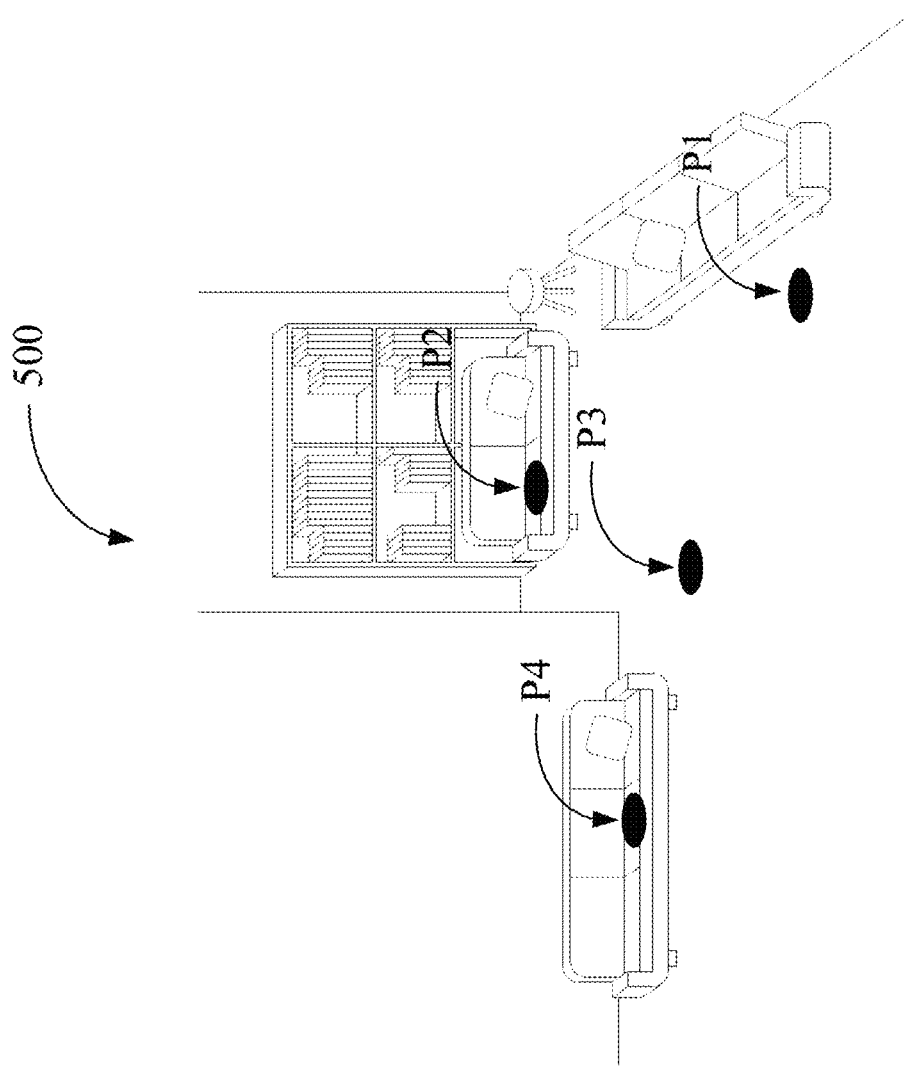
FIG. 5 is a schematic view depicting a spatial perspective image of some embodiments.

For ease of understanding, please refer to FIG. 5. FIG. 5 illustrates a schematic diagram 500 of a spatial perspective image. In the present example, the processor 25 can switch from other spatial perspectives to the spatial perspective as shown in schematic diagram 500, and generate video corresponding to the users based on this spatial perspective.

In some embodiments, in order to improve the quality of videos, users can freely adjust the viewing angle they want to watch. Specifically, the processor 25 receives a perspective switching signal corresponding to a first user (e.g., a perspective switching signal transmitted by a user device), and the perspective switching signal is configured to indicate switching to a first spatial perspective. Next, the processor 25 generates a first perspective video corresponding to the first spatial perspective based on the perspective switching signal.

In some embodiments, the processor 25 may dynamically update the user's image in the video based on the user's real-time image, so that users participating in the conference can interact more dynamically. Specifically, the processor 25 renders the three-dimensional portrait models in the video in real-time based on the target image of each of the real-time images to update the video.

In some embodiments, the processor 25 segments the real-time image into target images based on retaining edge information. Therefore, when compositing the target image to the three-dimensional scenario template, the video quality can be improved by compositing the edge information to the three-dimensional scenario template. Specifically, the processor 25 generates an edge block information corresponding to each of the target images based on an edge state of each of the target images. Then, the processor 25 composites the edge block information and the three-dimensional portrait models to the spatial label position of the first three-dimensional scenario template to generate the video corresponding to the users.

According to the above descriptions, the video generating device 2 provided by the present disclosure generates three-dimensional portrait models corresponding to each of the users by segmenting target images from each of the real-time images. Next, the video generating device 2 provided by the present disclosure determines a suitable three-dimensional scenario template from the three-dimensional scenario templates based on a user quantity and a position quantity corresponding to each of the three-dimensional scenario templates. Finally, the video generating device 2 provided by the present disclosure composites the three-dimensional portrait models to the spatial label position of the three-dimensional scenario template to generate video corresponding to the users. The video generating technology provided by the present disclosure can correspondingly select a suitable three-dimensional scenario template, and adaptively composite the three-dimensional portrait model to the three-dimensional scenario template, thereby solving the shortcomings of the conventional technology that the videos are too dull and the images are unnatural, and provides users participating in the meeting with an immersive experience that is closer to the real scene.

Figure 6:
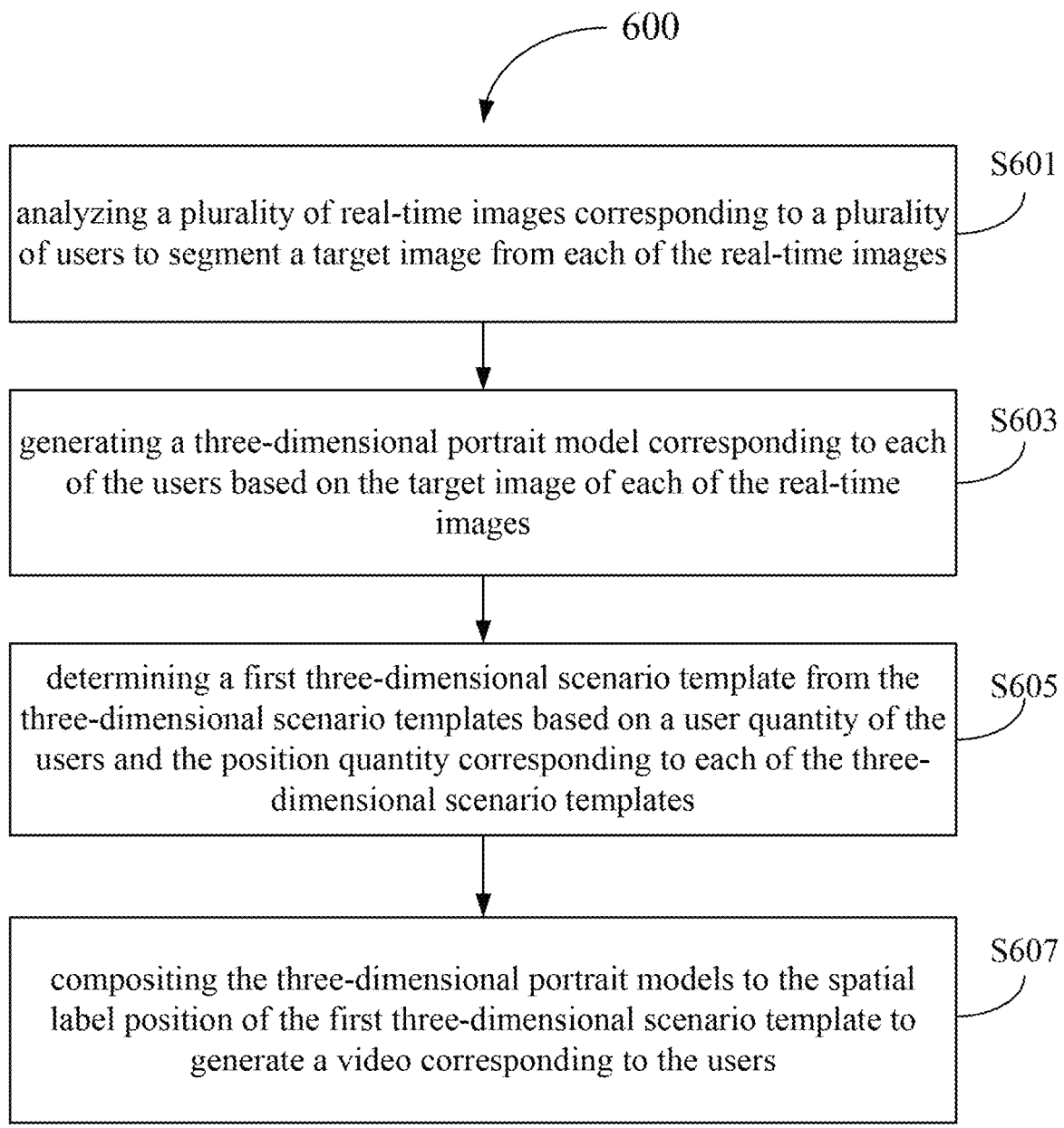
FIG. 6 is a partial flowchart depicting a video generating method of the second embodiment.

A second embodiment of the present disclosure is a video generating method and a flowchart thereof is depicted in FIG. 6. The video generating method 600 is adapted for an electronic apparatus (e.g., the video generating device 2 of the first embodiment). The electronic apparatus stores a plurality of three-dimensional scenario templates, each of the three-dimensional scenario templates corresponds to a position quantity and a spatial label position (e.g., the three-dimensional scenario templates T1, T2, ..., Tn of the first embodiment). The video generating method 600 generates video corresponding to a plurality of users through steps S601 to S607.

In the step S601, the electronic apparatus analyzes a plurality of real-time images corresponding to a plurality of users to segment a target image from each of the real-time images.

Next, in the step S603, the electronic apparatus generates a three-dimensional portrait model corresponding to each of the users based on the target image of each of the real-time images.

Next, in the step S605, the electronic apparatus determines a first three-dimensional scenario template from the three-dimensional scenario templates based on a user quantity of the users and the position quantity corresponding to each of the three-dimensional scenario templates.

Finally, in the step S607, the electronic apparatus composites the three-dimensional portrait models to the spatial label position of the first three-dimensional scenario template to generate a video corresponding to the users.

In some embodiments, the first three-dimensional scenario template further comprises an environment parameter, and the video generating method 600 comprises: rendering the three-dimensional portrait models based on the environment parameter to generate the video corresponding to the users.

In some embodiments, wherein the step of generating the video corresponding to the users further comprises the following steps: inputting the environment parameter of the first three-dimensional scenario template, the three-dimensional portrait models, and the spatial label position of the first three-dimensional scenario template into a pre-trained diffusion model to generate the video corresponding to the users; wherein, the environment parameter comprises a lighting indication vector and a pose attribute vector.

In some embodiments, the spatial label position of the first three-dimensional scenario template further corresponds to a portrait pose setting, and the video generating method 600 further comprises the following steps: compositing the three-dimensional portrait model corresponding to the portrait pose setting to the spatial label position of the first three-dimensional scenario template to generate the video corresponding to the user.

In some embodiments, the first three-dimensional scenario template further comprises a plurality of spatial perspectives, and the video generating method 600 further comprises the following steps: generating a perspective video corresponding to each of the spatial perspectives based on the spatial perspectives; and transmitting the perspective videos to a playing device based on a perspective switching mechanism to make the playing device performs a playing operation.

In some embodiments, the perspective switching mechanism is a speaking position priority, a random playing, or a round-robin playing.

In some embodiments, the three-dimensional scenario templates are generated based on the following steps: inputting a plurality of two-dimensional images and a description text corresponding to each of the two-dimensional images into a depth model to generate the three-dimensional scenario templates, wherein the depth model is trained by a plurality of scene depth maps.

In some embodiments, the video generating method 600 further comprises the following steps: rendering the three-dimensional portrait models in the video in real-time based on the target image of each of the real-time images to update the video.

In some embodiments, the step of segmenting the target image further comprises the following steps: generating an edge block information corresponding to each of the target images based on an edge state of each of the target images; and compositing the edge block information and the three-dimensional portrait models to the spatial label position of the first three-dimensional scenario template to generate the video corresponding to the users.

In some embodiments, wherein the video generating method 600 further comprises the following steps: receiving a perspective switching signal corresponding to a first user, wherein the perspective switching signal is configured to indicate switching to a first spatial perspective; and generating a first perspective video corresponding to the first spatial perspective based on the perspective switching signal.

In addition to the aforesaid steps, the second embodiment can also execute all the operations and steps of the video generating device 2 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

According to the above descriptions, the video generating technology (at least including the device and the method) provided by the present disclosure generates three-dimensional portrait models corresponding to each of the users by segmenting target images from each of the real-time images. Next, the video generating technology provided by the present disclosure determines a suitable three-dimensional scenario template from the three-dimensional scenario templates based on a user quantity and a position quantity corresponding to each of the three-dimensional scenario templates. Finally, the video generating technology provided by the present disclosure composites the three-dimensional portrait models to the spatial label position of the three-dimensional scenario template to generate video corresponding to the users. The video generating technology provided by the present disclosure can correspondingly select a suitable three-dimensional scenario template, and adaptively composite the three-dimensional portrait model to the three-dimensional scenario template, thereby solving the shortcomings of the conventional technology that the videos are too dull and the images are unnatural, and provides users participating in the meeting with an immersive experience that is closer to the real scene.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video generating device, comprising:
   a transceiver interface;
   a storage, being configured to store a plurality of three-dimensional scenario templates, wherein each of the three-dimensional scenario templates corresponds to a position quantity and a spatial label position; and
   a processor, being electrically connected to the transceiver interface and the storage, and being configured to perform operations comprising:
      analyzing a plurality of real-time images corresponding to a plurality of users to segment a target image from each of the real-time images;
      generating a three-dimensional portrait model corresponding to each of the users based on the target image of each of the real-time images;
      determining a first three-dimensional scenario template from the three-dimensional scenario templates based on a user quantity of the users and the position quantity corresponding to each of the three-dimensional scenario templates; and
      compositing the three-dimensional portrait models to the spatial label position of the first three-dimensional scenario template to generate a video corresponding to the users;
      wherein the operation of generating the video corresponding to the users further comprises the following operations:
         inputting an environment parameter of the first three-dimensional scenario template, the three-dimensional portrait models, and the spatial label position of the first three-dimensional scenario template into a pre-trained diffusion model to generate the video corresponding to the users;
         wherein, the environment parameter comprises a lighting indication vector and a pose attribute vector.

2. The video generating device of claim 1, wherein the first three-dimensional scenario template further comprises an environment parameter, and the processor further performs the following operations:
   rendering the three-dimensional portrait models based on the environment parameter to generate the video corresponding to the users.

3. The video generating device of claim 1, wherein the spatial label position of the first three-dimensional scenario template further corresponds to a portrait pose setting, and the processor further performs the following operations:
   compositing the three-dimensional portrait model corresponding to the portrait pose setting to the spatial label position of the first three-dimensional scenario template to generate the video corresponding to the user.

4. The video generating device of claim 1, wherein the first three-dimensional scenario template further comprises a plurality of spatial perspectives, and the processor further performs the following operations:
   generating a perspective video corresponding to each of the spatial perspectives based on the spatial perspectives; and
   transmitting the perspective videos to a playing device based on a perspective switching mechanism to make the playing device performs a playing operation.

5. The video generating device of claim 4, wherein the perspective switching mechanism is a speaking position priority, a random playing, or a round-robin playing.

6. The video generating device of claim 1, wherein the three-dimensional scenario templates are generated based on the following operations:
   inputting a plurality of two-dimensional images and a description text corresponding to each of the two-dimensional images into a depth model to generate the three-dimensional scenario templates, wherein the depth model is trained by a plurality of scene depth maps.

7. The video generating device of claim 1, wherein the processor is further configured to perform the following operations:
   rendering the three-dimensional portrait models in the video in real-time based on the target image of each of the real-time images to update the video.

8. The video generating device of claim 1, wherein the operation of segmenting the target image further comprises the following operations:
   generating an edge block information corresponding to each of the target images based on an edge state of each of the target images; and
   compositing the edge block information and the three-dimensional portrait models to the spatial label position of the first three-dimensional scenario template to generate the video corresponding to the users.

9. The video generating device of claim 1, wherein the processor is further configured to perform the following operations:

receiving a perspective switching signal corresponding to a first user, wherein the perspective switching signal is configured to indicate switching to a first spatial perspective; and generating a first perspective video corresponding to the first spatial perspective based on the perspective switching signal.

10. A video generating method, being adapted for use in an electronic apparatus, wherein the electronic apparatus stores a plurality of three-dimensional scenario templates, each of the three-dimensional scenario templates corresponds to a position quantity and a spatial label position, and the video generating method comprises:

analyzing a plurality of real-time images corresponding to a plurality of users to segment a target image from each of the real-time images;

generating a three-dimensional portrait model corresponding to each of the users based on the target image of each of the real-time images;

determining a first three-dimensional scenario template from the three-dimensional scenario templates based on a user quantity of the users and the position quantity corresponding to each of the three-dimensional scenario templates; and compositing the three-dimensional portrait models to the spatial label position of the first three-dimensional scenario template to generate a video corresponding to the users;

wherein the step of generating the video corresponding to the users further comprises the following steps:

inputting an environment parameter of the first three-dimensional scenario template, the three-dimensional portrait models, and the spatial label position of the first three-dimensional scenario template into a pre-trained diffusion model to generate the video corresponding to the users;

wherein, the environment parameter comprises a lighting indication vector and a pose attribute vector.

11. The video generating method of claim 10, wherein the first three-dimensional scenario template further comprises an environment parameter, and the video generating method comprises:

rendering the three-dimensional portrait models based on the environment parameter to generate the video corresponding to the users.

12. The video generating method of claim 10, wherein the spatial label position of the first three-dimensional scenario template further corresponds to a portrait pose setting, and the video generating method further comprises the following steps:

compositing the three-dimensional portrait model corresponding to the portrait pose setting to the spatial label position of the first three-dimensional scenario template to generate the video corresponding to the user.

13. The video generating method of claim 10, wherein the first three-dimensional scenario template further comprises a plurality of spatial perspectives, and the video generating method further comprises the following steps:

generating a perspective video corresponding to each of the spatial perspectives based on the spatial perspectives; and transmitting the perspective videos to a playing device based on a perspective switching mechanism to make the playing device performs a playing operation.

14. The video generating method of claim 13, wherein the perspective switching mechanism is a speaking position priority, a random playing, or a round-robin playing.

15. The video generating method of claim 10, wherein the three-dimensional scenario templates are generated based on the following steps:

inputting a plurality of two-dimensional images and a description text corresponding to each of the two-dimensional images into a depth model to generate the three-dimensional scenario templates, wherein the depth model is trained by a plurality of scene depth maps.

16. The video generating method of claim 10, wherein the video generating method further comprises the following steps:

rendering the three-dimensional portrait models in the video in real-time based on the target image of each of the real-time images to update the video.

17. The video generating method of claim 10, wherein the step of segmenting the target image further comprises the following steps:

generating an edge block information corresponding to each of the target images based on an edge state of each of the target images; and compositing the edge block information and the three-dimensional portrait models to the spatial label position of the first three-dimensional scenario template to generate the video corresponding to the users.

18. The video generating method of claim 10, wherein the video generating method further comprises the following steps:

receiving a perspective switching signal corresponding to a first user, wherein the perspective switching signal is configured to indicate switching to a first spatial perspective; and generating a first perspective video corresponding to the first spatial perspective based on the perspective switching signal.

* * * * *